(12) United States Patent
Denham, Jr. et al.

(10) Patent No.: US 6,479,025 B2
(45) Date of Patent: Nov. 12, 2002

(54) PROCESS FOR THE PRODUCTION OF SODIUM CARBONATE

(75) Inventors: Dale Lee Denham, Jr., Arvada, CO (US); Rudolph Pruszko, Green River, WY (US); Wayne C. Hazen, Denver, CO (US)

(73) Assignee: Environmental Projects, Inc., Casper, WY (US)

( * ) Notice: Subject to any disclaimer, the term of this patent is extended or adjusted under 35 U.S.C. 154(b) by 0 days.

(21) Appl. No.: 09/151,694

(22) Filed: Sep. 11, 1998

(65) Prior Publication Data

US 2001/0007650 A1 Jul. 12, 2001

Related U.S. Application Data

(60) Provisional application No. 60/058,643, filed on Sep. 11, 1997.

(51) Int. Cl.[7] ............................. C01D 7/00; C22B 26/10
(52) U.S. Cl. ........................................ 423/206.2
(58) Field of Search ..................... 423/210, 206.2, 423/421

(56) References Cited

U.S. PATENT DOCUMENTS

| | | | | |
|---|---|---|---|---|
| 2,704,239 A | * | 3/1955 | Pike | 423/190 |
| 3,244,476 A | | 4/1966 | Smith et al. | 23/63 |
| 3,425,795 A | | 2/1969 | Howard et al. | 23/63 |
| 3,479,133 A | | 11/1969 | Warzel | 23/63 |
| 3,498,744 A | | 3/1970 | Frint et al. | 23/63 |
| 3,528,766 A | | 9/1970 | Coglaiti et al. | 23/63 |
| 3,655,331 A | | 4/1972 | Seglin et al. | 23/63 |
| 3,717,698 A | | 2/1973 | Ilardi et al. | 423/206 |
| 3,819,805 A | | 6/1974 | Graves et al. | 423/206 |
| 3,869,538 A | | 3/1975 | Sproul et al. | 423/206 |
| 3,904,733 A | | 9/1975 | Gancy et al. | 423/206 |
| 3,933,977 A | | 1/1976 | Ilardi et al. | 423/206 |
| 3,936,372 A | | 2/1976 | Frangiskos | 209/3 |
| 4,022,868 A | | 5/1977 | Poncha | 423/184 |
| 4,202,667 A | | 5/1980 | Conroy et al. | 23/302 |
| 4,283,277 A | | 8/1981 | Brison et al. | 209/166 |
| 4,286,967 A | | 9/1981 | Booth et al. | 23/298 |
| 4,299,799 A | | 11/1981 | Ilardi et al. | 423/206 |
| 4,324,577 A | | 4/1982 | Sepehri-Nik | 71/33 |
| 4,341,744 A | | 7/1982 | Brison et al. | 423/206 |
| 4,375,454 A | | 3/1983 | Imperto et al. | 423/206 |
| 4,814,151 A | | 3/1989 | Benke | 423/206 |
| 5,139,749 A | * | 8/1992 | White | 423/171 |
| 5,238,664 A | | 8/1993 | Frint et al. | 423/206 |
| 5,470,554 A | | 11/1995 | Schmidt et al. | 423/206 |
| 5,911,959 A | * | 6/1999 | Wold et al. | 423/206.2 |
| 5,989,505 A | * | 11/1999 | Zolotoochin et al. | 423/206.2 |
| 6,010,672 A | * | 1/2000 | Turner | 423/206.2 |

FOREIGN PATENT DOCUMENTS

| | | | | |
|---|---|---|---|---|
| WO | 94/27725 | * | 12/1994 | 423/206.2 |
| WO | 96/22398 | * | 7/1996 | |

* cited by examiner

*Primary Examiner*—Steven Bos
(74) *Attorney, Agent, or Firm*—Sheridan Ross P.C.

(57) ABSTRACT

A process for the production of sodium carbonate monohydrate is disclosed. The process includes heating a feed stream containing trona and insoluble impurities in a calcining apparatus to a temperature of less than about 350° C. to form anhydrous sodium carbonate. The anhydrous sodium carbonate is contacted with a saturated sodium carbonate brine solution to form sodium carbonate monohydrate crystals. Sodium carbonate monohydrate crystals are separated from insoluble impurities.

23 Claims, 7 Drawing Sheets

FIG. 2

SETTLING TEST ON TRONA CALCINED IN AIR

FIG. 4
SUMMARY OF DATA FROM CALCINING TRONA IN CO2 AND AIR

| | \multicolumn{3}{c}{CALCINATION TEMPERATURE, DEGREES C} | | | | | | | | | |
|---|---|---|---|---|---|---|---|---|---|---|---|---|
| | | 150 | | | 300 | | | 450 | | | 600 | |
| | CO2 | CO2 NM | AIR | CO2 | CO2 NM | AIR | CO2 | CO2 NM | AIR | CO2 | CO2 NM | AIR |
| THICKENING TESTS: | | | | | | | | | | | | |
| SOLUTION COLOR | SLIGHT | SLIGHT | SLIGHT | YELLOW | YELLOW | AMBER | AMBER | YELLOW | SLIGHT | COLORLESS | COLORLESS | COLORLESS |
| FOAM | SLIGHT | SLIGHT | SOME | SOME | SOME | MUCH | MUCH | SOME | SLIGHT | NONE | NONE | NONE |
| HOURS TO: | | | | | | | | | | | | |
| 1/2 OF VOLUME | 0.8 | 0.3 | 1.3 | 2.9 | 0.6 | 1.9 | 4.0 | 1.3 | 3.5 | 6.4 | 2.1 | 24.0 |
| 1/3 OF VOLUME | 1.5 | 0.4 | 2.5 | 4.8 | 0.8 | 3.0 | 6.7 | 1.5 | 12.0 | 19.0 | 3.4 | |
| 1/4 OF VOLUME | 3.0 | 0.5 | 4.5 | 12.0 | 0.9 | 4.3 | 19.0 | 2.3 | 24.0 | | 13.0 | |
| FINAL VOL., ml | 78 | 53 | 82 | 112 | 54 | 75 | 127 | 52 | 140 | 175 | 125 | 237 |
| RATIO OF HOURS TO: | | | | | | | | | | | | |
| 1/2 OF VOLUME | 2.7 | 1.0 | 4.3 | 9.7 | 2.0 | 6.3 | 13.3 | 4.2 | 11.7 | 21.3 | 7.0 | 80.0 |
| 1/3 OF VOLUME | 3.8 | 1.0 | 6.3 | 12.0 | 2.0 | 7.5 | 16.8 | 3.8 | 30.0 | 47.5 | 8.5 | |
| 1/4 OF VOLUME | 6.0 | 1.0 | 9.0 | 24.0 | 1.8 | 8.6 | 38.0 | 4.6 | 48.0 | | 26.0 | |
| FINAL VOL., ml | 1.5 | 1.0 | 1.5 | 2.1 | 1.0 | 1.4 | 2.4 | 1.0 | 2.6 | 3.3 | 2.4 | 4.5 |
| FINAL % SOLIDS | 35. | 27. | 36. | 26. | 28. | 37. | 20. | 24. | 19. | 14. | 9. | 11. |
| NA2CO3 IN FINAL THICKENED PULP | | | | | | | | | | | | |
| DIST., % | 6 | 4 | 5 | 9 | 4 | 5 | 11 | 4 | 12 | 15 | 11 | 20 |
| RATIO | 1.5 | 1.0 | 1.4 | 2.3 | 1.0 | 1.3 | 3.0 | 1.2 | 3.1 | 4.0 | 2.8 | 5.3 |
| INSOL FROM GROUND CALCINE | | | | | | | | | | | | |
| WT. % PLUS 500 | 48.2 | 74.7 | 53.1 | 41.6 | 63.6 | 53.9 | 41.1 | 50.5 | 35.1 | 29.4 | 55.6 | 35.0 |
| LEACH SOLUTION ASSAYS | | | | | | | | | | | | |
| mg/l Si | <3 | | <3 | 9 | | 3 | 18 | | 9 | 117 | | 60 |
| mg/l ORGANIC C | 24 | | 51 | 66 | | 459 | 63 | | 57 | <15 | | 30 |
| g/l Al | <1 | | | <1 | | | <1 | | | <1 | | |

PROCESS FOR THE PRODUCTION OF SODIUM CARBONATE

CROSS REFERENCE TO RELATED APPLICATIONS

This application claims priority under 35 U.S.C. §119 (e) to U.S. provisional application Ser. No. 60/058,643, filed Sep. 11, 1997 and under 35 U.S.C. §120 to U.S. patent application Ser. No. 08/967,281, filed Jul. 3, 1997 and PCT/US94/05918, filed May 25, 1994.

FIELD OF THE INVENTION

The present invention relates to an apparatus for the calcination of materials and uses therefor.

BACKGROUND OF THE INVENTION

A variety of industrial processes involve the use of calcination to thermally decompose materials either to aid in the purification of materials or for use in an industrial process. Generally, calcination processes involve exposing the materials to be calcined to heat to thermally decompose the materials. Thus, calcination differs from thermal drying of materials in which free water is driven off by exposure to increased temperatures. In contrast, calcination involves changing the chemical composition of the material.

A number of apparatus are known for calcination processes. For example, rotary direct-fired calciners use an open flame as a heat source and therefore, necessitate the use of combustion air. Also, vertical fluid bed calciners use heated gas in direct contact with the material to be calcined.

Despite the well-known use of calcination, a number of problems exist in the use of conventional calcination processes. For example, the emission of by-products such as particulates causes pollution concerns. Additionally, a number of calcination processes are not energy efficient because much of the energy from the process is released to the atmosphere in the form of heat.

Further, many calcination processes which operate at high temperatures, such as use of open flame calciners, unevenly heat the material to be calcined. For example, in open flame rotary calciners, material contacting the flame may experience a temperature close to 1000° C., even though the average temperature in the calciner may be significantly below that temperature. In this manner, some particles may not be fully calcined and some may be combusted. Alternatively, some larger particles may be calcined on the outside, but not on the inside of the particle. This type of disadvantage can also have significant negative effects on downstream processing because the material exiting the calcination process is not uniform in its chemical composition. Therefore, subsequent processing will have more variable results than if the material from the calcination process was uniform in nature.

As a result of the above disadvantages of known calcination technology, there remains a need for improved calcination apparatus and methods of use.

SUMMARY OF THE INVENTION

One embodiment of the present invention is an indirect heat calcination apparatus for calcining materials. The apparatus includes a feed inlet, a calcining chamber which is interconnected to the feed inlet, an indirect heating element within the calcining chamber to transfer heat from a heated fluid to the material, a bed plate located below the indirect heating element within the calcining chamber, and a product collection chute which is connected to the calcining chamber. The apparatus can also include a plurality of holes on the bed plate and a gas inlet for introducing a fluidizing gas into the apparatus through the bed plate holes. The apparatus can include an exhaust port located above the calcining chamber. The exhaust port can also include an expansion chamber for slowing the velocity of gas exiting the calcining apparatus. The indirect heating element of the apparatus can be, for example, coils within the calcining chamber which conduct the heated fluid through the chamber. Thus, the indirect heating element can include a fluid inlet port and a fluid outlet port. The apparatus can also include a plurality of calcining zones which are defined by compartmental walls.

The present invention includes a calcining process for treating a saline mineral which includes introducing the saline mineral to a calcining chamber, heating the saline mineral to a temperature of less than about 350° by contacting it with an indirect heating element and removing the calcined material from the chamber. In this embodiment, the calcining chamber can include a bed plate located below the indirect heating element and having a plurality of bed plate holes and a gas inlet for introducing a fluidizing gas into the chamber through the bed plate holes. The calcining apparatus can also include an exhaust port located above the calcining chamber which can have an expansion chamber for slowing the velocity of exiting gas. The apparatus can also include a plurality of calcining zones defined by compartmental walls.

Other processes of the present invention include processes for calcining material and subsequent processing of the material. For example, such processing can include purification, such as crystallization.

An additional process of the present invention is a method for reducing the emission of pollutants during calcining. This process includes heating a saline mineral in a calcining vessel wherein the calcination step produces a gas comprising water vapor and a pollutant. The calcining gas is removed from the calcining vessel to an outlet and at least a portion of the water vapor in the calcining gas is condensed.

In this manner, a portion of the pollutants in the calcining gas are removed. This process can also include the use of a heat source for calcining which is not in direct fluid communication with the material to be calcined. In further a aspect, the material is calcined at temperatures less than about 250° C.

DETAILED DESCRIPTION OF THE INVENTION

In various embodiments of the present invention, processes and apparatus involve the use of a calcining step with low temperature heating of the feedstream at temperatures lower than conventional calcination, such as in direct fired rotary kiln calciners. More particularly, the calcining step of the present invention includes heating a feedstream to a temperature of less than about 350° C., more preferably less than about 250° C., and more preferably at a temperature from about 120° C. to about 250° C. As used herein, reference to heating a feedstream to less than a certain temperature refers to raising the temperature of the particles in the feedstream within the stated temperature constraints, and not to the temperature of the ambient atmosphere in the calciner or to the temperature of the heat transfer medium. Moreover, reference to heating a feedstream to less than a certain temperature requires that no substantial portion of particles in the feedstream be heated in excess of the stated temperature constraints. Thus, it should be recognized that while substantially the entire feedstream is maintained within the temperature constraints, particles which actually come into contact with a heat transfer surface, such as a heated tube, may exceed the temperature constraints. More particularly, however, no more than about 15 wt. % of the feedstream should be heated in excess of the stated temperature constraints, more preferably no more than about 10 wt. %, and most preferably no more than about 5 wt %. In another aspect, no portion of the material in the feedstream is heated in excess of about 450° C.

Calcination in accordance with these temperature constraints of the present invention provides a number of previously unrecognized significant benefits. As discussed in more detail below, the amount of pollutants from the calcination process is reduced with low temperature calcination. For example, low temperature calcination does not volatilize as many organic compounds from insoluble impurities as mid and high temperature calcination. Thus, fewer volatile organic compound (VOC) pollutants are generated by calcination. Also, fewer soluble organic compounds, such as sulfonates, are generated. Additionally, benefits in subsequent processing are obtained.

In a preferred embodiment, the calcination temperature constraints are more readily achieved by controlling the particle size and particle size distribution of particles in the feedstream. By having a relatively small particle size with a relatively narrow particle distribution, particles in the feedstream can be evenly heated to meet the temperature constraints as discussed above. More particularly, the feedstream to the calciner is typically comminuted to reduce the particle size. For example, the feedstream can be comminuted to a particle size of less than about ¼ inch, alternatively, less than about 6 mesh, and alternatively, less than about 20 mesh. In addition, the feedstream is preferably sized into multiple size fractions for calcining. More particularly, the feedstream is sized into 3 or more size fractions, more preferably 5 or more size fractions, and most preferably 7 or more size fractions. In this manner, it is more likely that sufficient heating of all the particles will occur to completely calcine them without excessively heating smaller particles in excess of the temperature constraints identified above. Thus, in a further embodiment, the present process includes calcination of at least about 95 wt. % of the feedstream, more preferably, at least about 98 wt. %, and most preferably, at least about 99.5 wt. %.

In a further embodiment of the present invention, the step of calcining is conducted by heating a feedstream in an inert atmosphere to produce a calcined material. The term inert atmosphere refers to any atmosphere which is less oxidizing than air. For example, an inert atmosphere can be an atmosphere of carbon dioxide. Alternatively, the carbon dioxide can also include water vapor and/or air. As discussed in m ore detail below, some gaseous by-products of calcination, such as carbon dioxide and water vapor generated as part of a calcining gas in some processes can be recycled and used as a fluidizing gas in a fluidized bed calciner.

The calcining step is preferably performed utilizing an indirect heating process in a calcining vessel such as a fluidized bed reactor. In the indirect heating process, the combustion gases from the heat source are not in direct fluid communication with the material being calcined, but rather provide heat to the material by conduction through, for example, heating coils, as described in more detail below.

The step of indirectly heating material for calcining comprises the steps of heating a fluid and bringing the heated fluid into thermal communication with material in the calcining vessel. As used in this invention, a "fluid" refers to a gas or a liquid medium. This step can be accomplished utilizing a heat source which provides the heated fluid to coils positioned within the interior of the calcining vessel. In one embodiment, the heat source is a steam boiler and the fluid is steam. Alternatively, the fluid may comprise oil or any other appropriate medium. The step of heating the fluid can comprise the steps of combusting an energy source to produce heat and combustion gas, transferring at least a portion of the heat to the fluid, and directing at least a portion of the combustion gas through a combustion gas outlet which is not in direct fluid communication with the calcining vessel.

Figure 5:
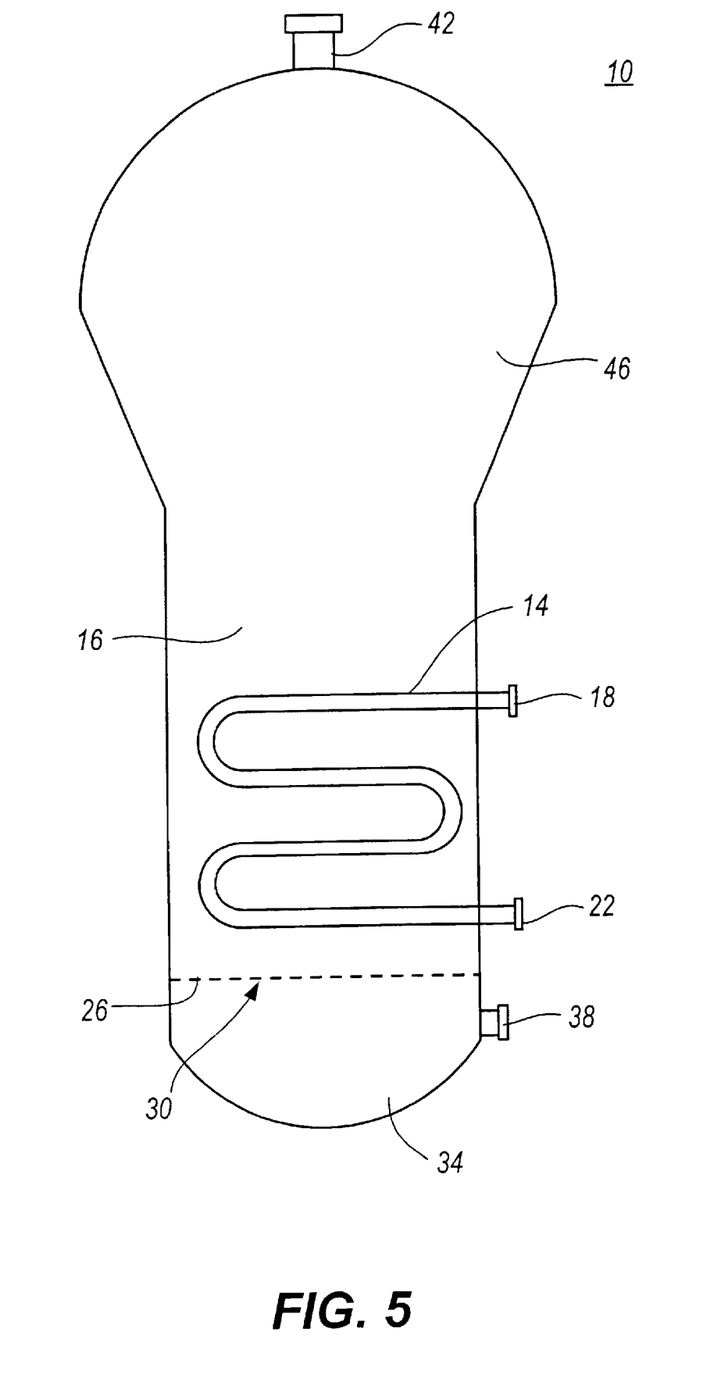
FIG. 5 is a side view of an indirect heat calcining apparatus of the present invention.

Referring to FIG. 5 there is shown one embodiment of an indirect heat calcination apparatus of the present invention. The indirect heat calcination apparatus 10 includes an indirect heating element 14 located within the calcining chamber 16 for providing indirect heat to the material. The indirect heating element 14 can be any conduit that allows a fluid to flow within its walls while facilitating the transfer of heat from the fluid to the material. As described above, the fluid is heated to a desired temperature and enters the indirect heating element 14 at an inlet port 18 and travels through the entire length of the indirect heating element 14 and exits through the outlet port 22. As the fluid travels through the indirect heating element 14, heat is transferred from the fluid to the indirect heating element 14 and ultimately to the material to be calcined. In this manner, the material is calcined without being exposed to a direct flame or heating fluid. Typically, a sufficient amount of material is added to the indirect heat calcination apparatus 10 to cover the entire indirect heating element 14 within the calcining chamber 16. However, a smaller amount of the material can be calcined using the apparatus of the present invention.

In order for an efficient heat transfer to occur, it is preferred that the indirect heating element 14 be made from a material which is a good heat conductor. Preferably, the material of indirect heating element 14 is selected from the group consisting of a metal such as copper, steel, iron, nickel, zinc, stainless steel and mixtures thereof; ceramics; and composites. More preferably, the material of indirect heating element 14 is selected from the group consisting of steel and stainless steel and most preferably, is stainless steel.

As described above, the fluid for providing the heat for calcination can be any liquid or gas which can be heated to a sufficiently high temperature required for calcination. Such fluids include water, steam, oil, and gases, including air. For calcining trona, preferably the fluid is steam.

Again referring to FIG. 5, it is preferred that the fluid inlet port 18 is located above the fluid outlet port 22. This arrangement ensures that a lower amount of energy is required to operate the indirect heating element 14 because gravity aids in removing fluid from the indirect heating element 14. Moreover, when a gas such as steam is used, it is possible that some of it may condense to a liquId form as the heat is transferred to the indirect heating element. The presence of a condensed liquid within the indirect heating element 14 reduces the amount of heat transferred to the indirect heating element 14 because some of the energy will be used to heat the condensed liquid. In order to reduce this problem, the inlet port 18 is located above the outlet port 22 to facilitate the removal of any condensed liquid.

The indirect heating element 14 can be positioned within the apparatus 10 such that the indirect heating element 14 traverses back and forth across the apparatus and from top to bottom. This arrangement provides a large indirect heating element surface area. However, even with this arrangement, the amount of surface area of the indirect heating element 14 is limited; therefore, not all of the material particles will come in direct contact with the indirect heating element 14 when the material is stationary within the apparatus. Although all of the particles can be heated to a desired calcination temperature by prolonged exposure to the indirect heating element 14 and allowing the heat to transfer from one particle to another and eventually reaching an equilibrium, this method of stationary indirect heat calcination requires a large amount of energy and time rendering the apparatus rather inefficient. To expedite the calcination process and/or to reduce the amount of energy required, substantially all of the particles within the calcining chamber 16 can be made to be dynamic, i.e., nonstationary within the calcining chamber 16, during at least a portion of the calcination process. Any method of creating a dynamic motion of the particles can be used such as stirring, shaking and agitating.

In one particular embodiment, the particles are placed on top of the bed plate 26 and are fluidized by a fluidizing gas which is introduced into the calcining chamber through a plurality of bed plate holes 30. This fluidization process causes a juggling effect of the particles and allows more particles to come in a direct contact with the indirect heating element 14, resulting in a relatively even distribution of heat among the material particles. In addition, this fluidization process can be used to separate the particles based on the difference in density. The juggling effect provided by the fluidizing gas allows relatively heavy particles to settle to the bottom of the pile while allowing relatively light particles to "float", i.e., concentrate, to the top of the pile.

The primary heat transfer mechanism is the material to coil contact and not the material to fluidizing gas contact. Therefore, the fluidization gas velocity and volume has to be low or kept to a minimum to maximize the contact of the material to the indirect heating coils. This concept is contrary to current technology where the coils in a fluid bed calciner are used to heat the fluidizing gas which in turn is used to heat the material. In such a process, large volumes of fluidizing gas is required for the heat transfer to the material to take place.

The indirect heat calcination apparatus of the present invention can also include a gas plenum 34. The gas plenum 34 may be located underneath the bed plate 26 to provide a substantially equal gas pressure throughout the bed plate holes 30. These holes can be angled, vertical or perpendicular to the direction of gas from the plenum to the calcination bed. Angled holes will aid in the direction of flow of material through the calcining zone. In this embodiment, the angle of the hole must be greater than the angle of repose of the material being calcined to prevent material from falling into the hole. Moreover, the presence of a gas plenum 34 in the apparatus 10 also reduces a possibility of particles falling through the bed plate holes 30 and blocking the flow of fluidizing gas into the apparatus. In operation, the fluidizing gas is introduced into the apparatus 10 through a gas inlet 38 into the gas plenum 34. As some materials are calcined, the density of the material decreases. With the lower density, the amount of fluidization gas needed decreases. Therefore, individual flow controls for the fluidizing gas to each calcining zone is preferred. In one particular embodiment, fluidizing gas is heated to about the same temperature as the temperature of the heating coils to prevent cooling of material particles and/or to maintain the temperature above the dew point. In this manner, condensation of water in the fluidizing gas is avoided.

The indirect heat calcination apparatus 10 of the present invention can also include an exhaust port 42 to prevent excess pressure build-up within the apparatus or to remove any volatile compounds which are released or generated from the material during the calcination process. The exhaust port is located above the material level to allow the fluidizing gas to fluidize the material particles. Since the particles are not all identical size, it is expected that some of the lighter particles, e.g., smaller particles or the material dust, will be carried into the exhaust port 42.

Figures 5A, 7A, 7B:
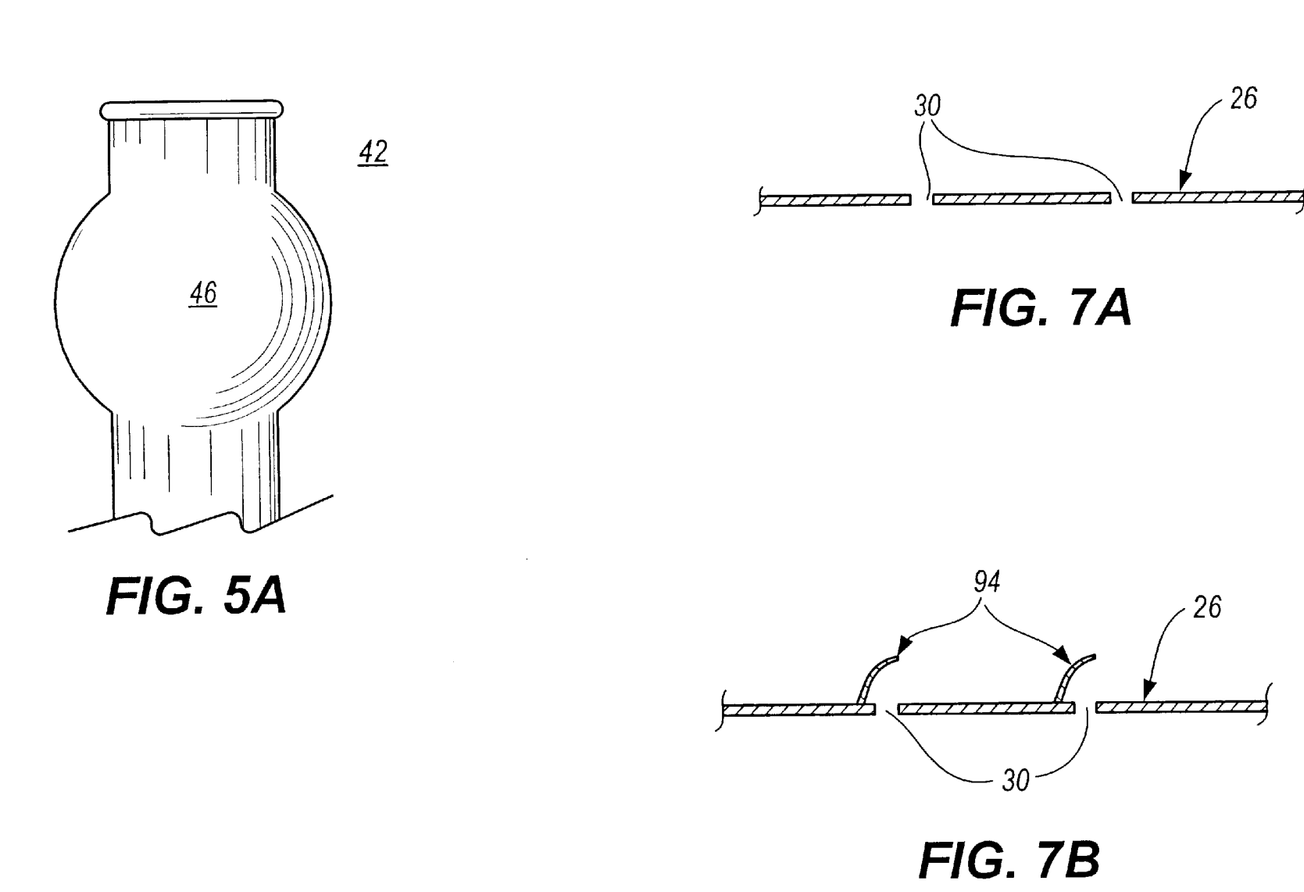
FIG. 5A is an illustration of a one-piece exhaust port containing an expansion chamber.
FIG. 7A is an illustration of a bed plate having a fluidizing gas inlet holes.
FIG. 7B is an illustration of bed plate having a fluidizing gas inlet holes and a gas-flow deflector.

In order to reduce the amount of particles removed from the apparatus by the action of the fluidizing gas, the indirect heat calcination apparatus 10 of the present invention can also include an expansion chamber 46 which is located below or near the exhaust port 42. The cross-sectional area of the expansion chamber 46 is larger than the cross-sectional area of the calcining chamber 16, and as a result the velocity of gas, i.e., the flow rate, decreases as the fluidizing gas flows from the calcining chamber 16 into the expansion chamber 46. This decrease in the fluidizing gas flow rate results in some of the solids carried upward into the expansion chamber 46 by the fluidizing gas to settle and drop back down into the calcining chamber 16, thus reducing the particulate emission from the calcination apparatus. The expansion chamber is even more important in a case where the material releases vapor upon during calcining. This is the case with trona, where carbon dioxide and water vapor are released. This release of vapors increases the volume of fluidizing gas in the calciner bed and therefore increases the velocity of the fluidizing gas. This effect further entrains particles that can be returned to the calciner bed with the use of an expansion zone. Moreover, the exhaust port 42 can be fitted with other. apparatus to collect any material that is released through the exhaust port 42. For example, a condenser can be fitted to the exhaust port 42 to condense and collect water vapor or other useful materials, a filter can be fitted to further reduce the amount of particulate matter that is released into the environment, or a gas collector can be fitted to collect or recycle the fluidizing gas or other gases which may be released through the exhaust port 42. Alternatively, the exhaust port 42 and the expansion chamber 46 can be a single unit piece, i.e, the expansion chamber 46 can be an integral part of the exhaust port 42 as shown in FIG. 5A.

Figure 6:
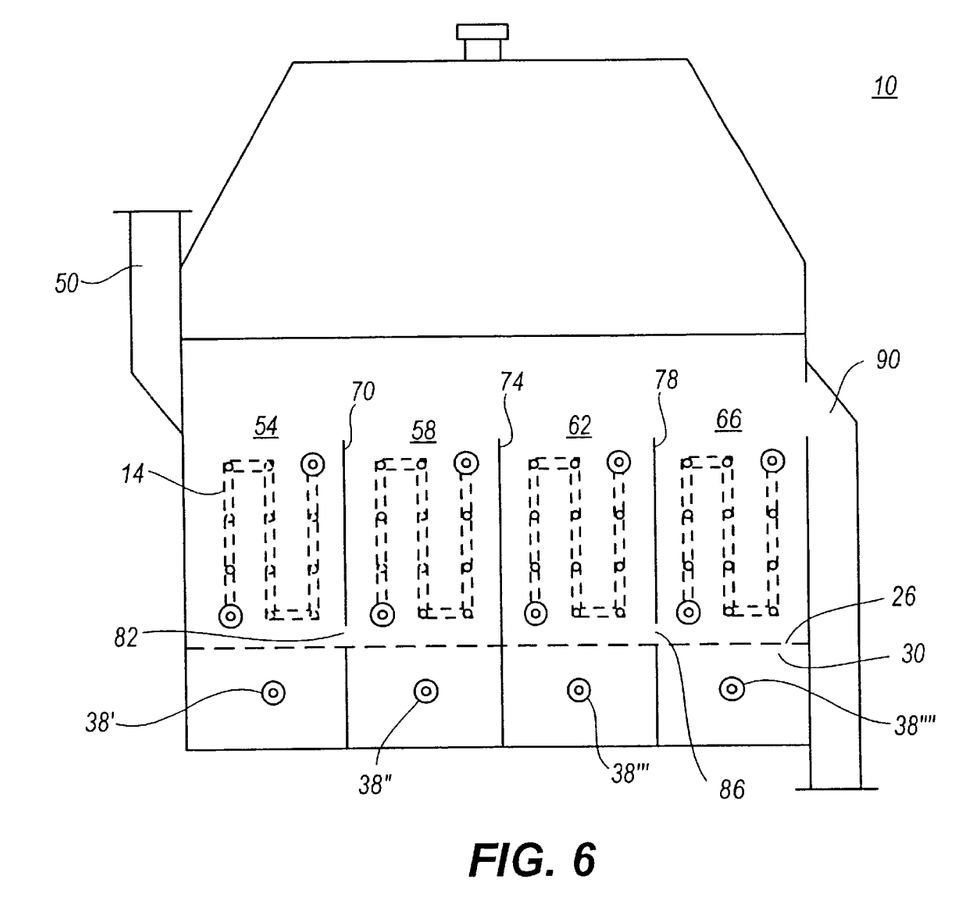
FIG. 6 is a plan view of an indirect heat calcining apparatus of the present invention.

A process for indirect heat calcination of a material using the apparatus of the present invention will now be described in reference to FIG. 6 which illustrates the indirect heat calcination apparatus having four different calcining zones 54, 58, 62 and 66, that are separated by three compartmental walls 70, 74 and 78. The material can be pretreated, e.g., comminuted, size separated and/or dried, prior to being calcined using the indirect heat calcining apparatus of the present invention. In a typical operation, a feedstream of comminuted material is introduced into the apparatus 10 through a feed inlet 50. In order to reduce the amount of agglomeration of particles due to the moisture that is present in the calcining atmosphere, the indirect heat calcining apparatus 10 can also include a predried-gas inlet (not shown) near the feed inlet 50 for reducing the moisture level of the particles or moisture in the atmosphere from coming in contact with particles. Alternatively, the first calcining zone 54 can be used as both a pre-drying region as well as the first calcining zone. However, if a separate predried-gas inlet is used, the diameter of the predried-gas inlet is selected to ensure that a sufficient gas flow rate is maintained to provide a sufficient level of pre-drying. Factors influencing the diameter of the predrying-gas inlet include the particle size of the material, the moisture level of the calcining atmosphere, density of the material, and the desired gas flow rate. Pre-heating with dry fluidization gas is used to allow material of a lower temperature to enter the calciner and mix into the material bed before condensation can occur on the entering material. Condensation on the material can cause agglomerates to form or caking. The temperature of this gas is less than the calcining temperature, but above the dew point for the material's moisture content. It is also important not to let the material reach a temperature above the calcination temperature before it is fluidized, otherwise moisture released during calcination can cause the particle to cake. To limit the temperature in the first calcining zone to prevent condensation and caking of material, the amount of heating element, such as coils, for conducting heating fluid in the first calcining zone can be less than in other zones. In addition, the first calcining zone can also include already calcined material to reduce the amount of gas released from calcination in the first zone.

The primary purpose of heating the material with the pre-drying gas is to reduce the amount of moisture present where the ore enters the calciner. Thus, although some of the material may be calcined during this pre-drying process, the majority of the material is not calcined by this pre-drying process. Drying the material reduces the agglomeration, thus maintaining the high surface area of the particles which is desired for indirect heat calcination. Particles having a high surface area to volume ratio can be calcined more quickly and/or more efficiently than the particles having a low surface area to volume ratio.

The rate of pre-dried gas flow depends on a variety of factors including the feed rate, the particle size and the density of impurities and/or the material being calcined.

As the materials are introduced into the first calcining zone 54, they are fluidized by a fluidizing gas and are heated by the indirect heating element 14. The materials then flow to the second calcining zone 58, the third calcining zone 62 and the fourth calcining zone 66, in a successive manner. Although FIG. 6 shows each calcining zones having its own gas inlet 38 and flow control (not shown), the apparatus can have less than one gas inlet per calcining zone for providing the fluidizing gas to the entire bed plate 26 of the apparatus 10. As more material is fed to the first zone 54, at least a portion of the materials in the first zone 54 flows in to the second zone 58 through the opening 82. As the height of the feedstream in the second zone 58 reaches the top of the compartment wall 74, the material overflows into the third calcination zone 62. At least a portion of the material in the third calcination zone 62 then flows into the fourth calcination zone 66 through the opening 86. The calcined material then overflows into the product collection chute 90 where it is collected.

Having a multiple calcination zone provides a longer average residence time for material within the indirect heat calcination apparatus 10. The desired average residence time depends on a variety of factors including the temperature of the indirect heating element 14, the feed rate, the particle size of the feed, the completeness of calcination of the feedstream and the amount of time required to calcine the material. The underflow/overflow design forces contact of the material being calcined with the coils.

Referring again to FIG. 6, as the material flows into the second calcining zone 58, the fluidizing gas can be used to provide a density separation as described above. In this manner, the lighter materials will be concentrated on the top portion and the denser materials will be concentrated on the bottom portion. In the case of trona ore being calcined, this means that the lighter anhydrous sodium carbonate and/or trona will be on the top portion and the heavier impurities such as shortite, shale and/or pyrite will be concentrated in the bottom portion. A similar density separation can be achieved in the fourth calcining zone 66. By allowing a means for removing the bottom impurity concentrated portion in the second and/or the fourth calcination zones, a substantially purified calcined material can be collected through the product collection chute 90.

Alternatively, all the flow of the material from one calcining zone to another calcining zone can be made to proceed over the compartmental walls, thus eliminating a need for openings 82 and 86. One way this can be accomplished is by increasing the fluidizing gas flow directly adjacent to the compartment wall to the point where all material including high density material is forced to overflow the compartmental wall. In order to prevent back-flow of the materials, the successive compartment walls can be lower in height than the previous compartment wall. In this manner, each successive calcining zone will contain less amount of heavier impurities.

As shown in FIG. 7A, the bed plate holes 30 can simply be an opening, in which case the direction of the gas flow is substantially perpendicular to the opening of the bed plate holes 30 or can be determined by the direction of gas-flow prior to entering the bed plate holes 30.

Alternatively, as shown in FIG. 7B, the bed plate holes 12 can also include a gas flow deflector 94 which is placed above the bed plate holes 30. The deflector 94 can serve a multiple purposes. For example, it can be designed to prevent any particles from entering, or falling through, the bed plate holes 30. Another way to achieve this result is to punch holes in the plate at an angle. In addition, the movement of the particles towards the product collection chute 90 can be facilitated by using the gas flow deflector 94 to introduce the fluidizing gas in the direction towards the product collection chute 90. Thus, the average residence time of the particles can be controlled by using the fluidizing gas and the gas flow deflector 94.

The materials calcined using the indirect heat calcination apparatus of the present invention have unique product characteristics because of the use of low heat and relatively even heating of the particles during the calcination process. In addition, the materials can be further processed, including dry separation such as density separation, electrostatic separation, magnetic separation, calorimetric separation; and wet separation such as recrystallization methods and evaporative crystallization methods.

The utilization of indirect heating for calcining material provides significant benefits in that it significantly reduces the amount of gas flowing through the fluidized bed because no combustion gas flows through the bed. In this manner, a significantly lower amount of particulates from the material are entrained and need to be removed from exhaust gas from the calcining operation. More specifically, the amount of gas required for fluidization is typically about 80% less than the amount of gas produced during the combustion necessary to produce sufficient heat for the calcining process (e.g., utilizing natural gas in a steam boiler). Accordingly, by utilizing a source of gas for fluidization which is different than the combustion gases, a smaller amount of fluidizing gas can be used. Further, the smaller amount means that the fluidizing gas will flow at lower velocities, thereby potentially reducing particulate entrainment even further. In addition, less fluidizing gas means that less gas needs to be scrubbed for particulates before emission, thereby reducing the costs of the calcining process.

It is well known that some calcining processes produce calcining gas having a significant amount of water vapor. For example, in the instance of calcining trona to produce anhydrous sodium carbonate, calcining three moles of trona produces five moles of water and one mole of carbon dioxide. In order to reduce the amount of calcining gas exiting the system, the process may further comprise the step of condensing at least a portion of the water vapor from the calcining gas by, for example, cooling the calcining gas. Such condensation step will reduce the calcining gas volume by as much as ⅝ths, thereby reducing the amount of calcining gas which must be treated. In addition to reducing the volume of gas exiting the system, the condensing step also has a scrubbing effect on the calcining gas by removing particulates from the calcining gas. It is believed that the amount of particulates removed is proportional to the amount of gas removed (i.e., as much as ⅝ths or more in the case of trona). It is estimated that the particulate emission from a process for calcining trona ore in a direct-fired rotary calciner is typically about 6 lbs/ton of feed. By practice of the present process, including indirect calcination and condensing water from calcining gas, the particulate emissions from calcination of trona ore can be less than about 3 lbs/ton of feed, more preferably less than about 1.5 lbs/ton of feed and most preferably less than about 1 lbs/ ton of feed.

In a preferred embodiment, the condensing step for condensing water from gas produced during calcining comprises two stages. In the first stage, a small amount (e.g., less than about 5%) of the water vapor within the calcining gas is condensed to significantly reduce the particulate content of the gas. The first stage can be performed utilizing a water-cooled condenser, such as a tubed condenser. In the second stage, as much as 80% of the water vapor is condensed. Because of the reduction in particulate content resulting from the first stage, the water condensed from the second stage is essentially distilled water grade. A third stage may be added to further scrub particulates from the gas. For example, a high-efficiency venturi scrubber or electrostatic precipitator may be used.

The water which is removed during the condensing steps can be utilized for other processes. For example, the condensed water may be cooled (e.g., using air coolers) and then recycled and used as the cooling medium to condense further water vapor from the calcining gas by bringing the cooled water into thermal communication with the precondensed calcining gas. Further, the condensed water could be utilized for processes in other areas of a facility which involve the use of water. The condensed water may also be treated and utilized for almost any other appropriate purpose, such as for general water usage in the facility (e.g., for cleaning, drinking water, etc.).

Calcining gas which is produced during the calcining process may be removed from the calcining vessel through a calcining gas outlet, and at least a portion of the calcining gas (proportional to the amount of $CO_2$ produced in the calcining process) may be expelled through a stack. The expelled gas is preferably heated prior to exiting through the stack to inhibit condensation and plume formation at the stack outlet. For example, the expelled gas can be mixed with hot combustion gas from heating fluid for indirect calcination.

Another portion of the calcining gas may be recycled back to the inlet of the calcining vessel and utilized for heating and fluidizing additional material for calcining. Preferably, this gas is recycled and/or heated after the above-noted condensation step, thereby resulting in dry gas as the heating and fluidizing medium. The recycled gas may be heated (e.g., by steam coils) in order to bring the gas up to a temperature prior to entry into the calcining vessel. In one embodiment, the recycled gas temperature is between about 120° C. and about 200° C., and is preferably about 140° C. This recycling of gas is beneficial in that it utilizes latent heat within the calcining gas as part of the energy required for calcining, rather than heating ambient temperature gas up to calcining temperature. Further, such recycling reduces the gas requirements and emissions of the process by eliminating the need for fresh gas.

In a further embodiment of the present invention, a density separation is conducted in the calcining vessel. As some materials are calcined, they lose mass while impurities in the material do not. In this manner, the apparent density of the calcined material is less compared to the impurities and can, therefore, be separated on a density separation basis. For example, as trona, containing impurities such as shale, pyrite and/or shortite, is calcined, the sodium carbonate particles lose mass and become less dense, thereby, creating a significant density difference between the anhydrous sodium carbonate and the impurities. Thus, in a fluidized bed, the anhydrous sodium carbonate will migrate to the top of the bed and the denser impurities will migrate to the bottom. For example, an average apparent density of calcined trona is less than about 1.6. An average density of a bottom impurity stream in this embodiment is greater than about 2.1, more preferably greater than 2.3, and most preferably greater than about 2.5. Thus, a further aspect of the present invention is to calcine trona and remove a particle stream comprising impurities from the bottom of the calciner bed. As will be appreciated, depending on how much of an impurity stream is taken, the impurity stream may include some sodium carbonate. However, a bottom stream will contain primarily impurities, such as shale, pyrite and/or shortite, and the concentration of sodium carbonate in top stream is greater than in the bottom stream. More particularly, the concentration of sodium carbonate in the top stream will be at least about 96 wt. %, more preferably at least about 98 wt. %, and most preferably at least about 99 wt. %.

After calcination of materials, subsequent processing of some sort is typically conducted on the material. Often, such subsequent processing involves purification. In a preferred embodiment of the present invention, the material being calcined is a saline mineral, and the calcined saline mineral is subsequently processed by purification in a crystallization process. In a further preferred embodiment, the saline mineral is trona. By way of example, a particular crystallization process for purification of saline minerals will be described in detail. Use of the present calcination process and apparatus (specifically, low temperature calcination) provides significant benefits in terms of crystallization processes for saline minerals, including among other things, larger crystals.

As used herein, the term "saline mineral" refers generally to any mineral which occurs in evaporite deposits. Saline minerals that can be beneficiated by the present process include, without limitation, trona, borates, potash, sulfates, nitrates, sodium chloride, and preferably, trona.

The purity of saline minerals within an ore depends on the deposit location, as well as on the area mined at a particular deposit. In addition, the mining technique used can significantly affect the purity of the saline minerals. For example, by selective mining, higher purities of trona ore can be achieved. Deposits of trona ore are located at several locations throughout the world, including Wyoming (Green River Formation), California (Searles Lake), Egypt, Kenya, Venezuela, Botswana, Tibet and Turkey (Beypazari Basin). For example, a sample of trona ore from Searles Lake has been found to have between about 50% and about 90% by weight (wt. %) trona and a sample taken from the Green River Formation in Wyoming has been found to have between about 80 and about 90 wt. % trona. The remaining 10 to 20 wt. % of the ore in the Green River Formation sample comprised impurities including shortite (1–5 wt. %) and halite, and the bulk of the remainder comprises shale consisting predominantly of dolomite, clay, quartz, kerogen and iron, and traces of other impurities. Other samples of trona ore can include different percentages of trona and impurities, as well as include other impurities. The present process can also be used with feedstreams having lower impurity contents, including impurity levels as low as 0.1% by weight.

The crystallization process described herein is particularly well adapted for use with feedstreams having high contents of insoluble impurities. For example, the present invention is suitable for use with feedstreams having greater than about 4% by weight insoluble impurities, more particularly greater than about 15% by weight insoluble impurities, and even more particularly greater than about 30% by weight insoluble impurities. The present process can also be used with feedstreams having lower impurity contents, including impurity levels as low as 0.1% by weight.

The sodium carbonate resulting from calcination of trona, as described above, is treated by purification in a crystallization process to remove insoluble impurities. A first crystallization process includes contacting the calcined feedstream comprising sodium carbonate and insoluble impurities with a saturated sodium carbonate brine solution, the saturated sodium carbonate brine solution being maintained at a temperature between about 35° C. and about 112° C., more preferably between about 85° C. and about 112° C., and most preferably between about 95° C. and about 112° C., to form sodium carbonate monohydrate crystals and separating the sodium carbonate monohydrate crystals from the saturated sodium carbonate brine solution, preferably on a size separation basis. The sodium carbonate monohydrate crystals which are removed from the brine solution can be dewatered, dried and eventually converted to anhydrous sodium carbonate. Such a process is described generally in U.S. Pat. No. 3,948,744 to Frint, which is hereby incorporated by reference.

In particular, sodium carbonate monohydrate crystals having a crystal size of greater than about 150 mesh, more preferably greater than about 100 mesh, and more preferably greater than about 80 mesh, can be obtained by the present process. By forming large sodium carbonate monohydrate crystals, significant advantages are obtained. For example, the ability to recover purified crystals on a size separation basis is enhanced. Larger crystals enable greater recovery yields when separating crystals from smaller insoluble impurities, such as in the case of recovering sodium carbonate from a feedstream of trona ore. Thus, in a further aspect of the invention, the crystallization process is conducted in the absence of procedures, such as grinding or shearing, which significantly reduce crystal size in the crystallization operation.

As noted, a preferred method of recovery of sodium carbonate crystals is on a size separation basis. Such a basis involves the separation of sodium carbonate monohydrate crystals from impurities based on differences in size between the sodium carbonate monohydrate crystals and the impurities. Typically, impurities which can occur in the trona feedstream include iron-bearing materials, dolomite, shale, shortite, searlesite and northupite. It will be recognized that the size of insoluble impurities will not be affected by the recrystallization process. Thus, the initial particle size of an insoluble impurity will be the minimum particle size at which size separation of crystals can occur. Moreover, the particle size of insoluble impurities can be reduced prior to introduction into the brine solution by grinding the feedstream to smaller sizes. Typically, the feedstream has a particle size of minus 100 mesh and more preferably minus 200 mesh. The size separation is typically conducted at a size from about 80 mesh to about 150 mesh, and even more particularly at about 100 mesh.

A significant advantage of the low temperature calcination process described above is that subsequent recovery of impurities is made easier. It has been determined that low temperature calcination makes the insoluble impurities less likely to break down into ultrafine particle sizes, such as less than about 500 mesh. Thus, ease of subsequent recovery and denaturing of the particles is significantly increased.

Size separation can be affected by any known appropriate method. For example, screening or elutriation can be used. In the instance of screening, the oversize material from a first screening may be transferred to a repulping operation for suspension of crystals in the oversize fraction by adding clean liquor to a repulp tank to obtain a more efficient screening in a second size separation.

Upon introduction of a feedstream into a saturated brine solution, a problem which can be encountered is clumping and poor dispersion of sodium carbonate. In another embodiment of the invention, in order to avoid clumping and to allow for adequate dispersion of the sodium carbonate within the brine solution, the brine solution is agitated during introduction of the feedstream containing sodium carbonate. In another embodiment, the feedstream may be preheated to a temperature above about 175° C. and blown into the brine solution.

Once sodium carbonate monohydrate crystals are separated from the saturated brine solution, the crystals are dewatered, such as by centrifugation. The crystals can then be converted to the anhydrous form of sodium carbonate after dewatering for use in industry, such as in the production of glass. Conversion of sodium carbonate monohydrate to the anhydrous form after dewatering provides significant advantages over conversion while in a slurry. To convert to the anhydrous form while in a slurry, the temperature of the slurry must be above the boiling point of water. Thus, the process needs to be conducted in a pressurized system. The equipment necessary for such systems introduces significant cost and complexity compared to the present process.

The size of the monohydrate crystals may be effected by varying the feed rate and/or temperature of the anhydrous sodium carbonate introduced to the saturated sodium carbonate brine solution and by varying the crystal size distribution of the sodium carbonate monohydrate seed. Furthermore, appropriate residence times of sodium carbonate monohydrate crystals in the brine solution for crystallization can be selected by those skilled in the art. It should be recognized, however, that longer residence times will result in larger monohydrate crystals which can have significant advantages with respect to recovery, as discussed above. It is believed that residence times of the sodium carbonate monohydrate crystals in the brine solution could be as little as fifteen minutes, but can be significantly longer as well. In one preferred embodiment, the residence time of the crystallization can be greater than about one and a half hours, more preferably greater than about three hours and more preferably greater than about five hours. It will be recognized that residence time corresponds to feed rate into the crystallizer. In a further embodiment, the feed rate into the crystallizer is less than about 0.4 lbs. of anhydrous sodium carbonate per minute per gallon, more preferably less than about 0.3 lbs. per minute per gallon and even more preferably, less than about 0.2 lbs. per minute per gallon.

For example, by maintaining a crystal size distribution with a high degree of uniformity of size, crystals can be efficiently grown to a large size. That is, if crystal size distribution is widely spread over a great number of small to large crystals, while some new crystal growth will be efficiently spent on making large crystals larger, some such growth will be inefficiently spent on making small crystals grow to a size that will still not be recovered because it will be below the size separation cutoff. Thus, a further aspect of the present crystallization process is to maintain a narrow crystal size distribution of sodium carbonate monohydrate seed crystals. This aspect of the invention is particularly important when the feedstream includes insoluble impurities because adequate crystal growth is necessary to obtain crystals having a larger size than the insoluble impurities. This aspect of the invention can be accomplished by a variety of techniques. For example, by removing small crystals, either continuously or intermittently, from the crystallization vessel, the crystal size distribution will be narrowed with the average crystal size of the remaining crystals being greater than before removal. More specifically, crystals having a crystal size less than about 150 mesh, more particularly less than about 200 mesh and even more particularly less than about 400 mesh can be removed for this purpose.

In a further embodiment of the present invention, after recovery of sodium carbonate from the saturated brine solution, sodium carbonate in the non-recovered portion can also be kept in the system for subsequent recovery. As will be appreciated, the non-recovered portion comprises insoluble impurities and residual sodium carbonate monohydrate crystals having a particles size smaller than the size separation cutoff. For example, when recovery is made on a size separation basis, the non-recovered portion will have crystals with a size below the size separation cutoff. In this instance, the non-recovered portion can be treated to recover sodium carbonate values from crystals which are smaller than the size separation cutoff. Such a treatment can include dissolving the small crystals, such as by the addition of wash water, and then making a solid/liquid separation to remove solid impurities from the dissolved crystals. Then, the solution can be recycled to other points in the process for use in washing, etc., so that the solution ultimately returns to the crystallization unit for recovery of dissolved sodium carbonate. Alternatively, the water in the sodium carbonate solution could be driven off (e.g., by heating) to recover the sodium carbonate by crystallization.

When insoluble impurities are removed by a solid/liquid separation, most typically, the waste stream is sent to a clarifier, settling tank or other gravity purification apparatus. As illustrated below in the Example section, calcination in accordance with the present invention and in particular, in accordance with temperature constraints results in faster and more compact settling of insoluble impurities. This result provides significant cost and operational advantages in the process. Because the settling of impurities occurs more quickly and thus, is more efficient, the capital requirements for a plant using this process are significantly lower. In addition, the resulting muds have a higher solids content and therefore, can be readily disposed of. More particularly, insoluble impurities produced by the process of the present invention, in the absence of a flocculant or other settling aid, can settle to a final density of at least about 20% solids, more preferably to a final density of at least about 25% solids, and most preferably to a final density of at least about 30% solids.

A second crystallization process includes dissolving the anhydrous sodium carbonate in solution to form a sodium carbonate solution. At least a portion of insoluble impurities present in the calcined sodium carbonate are separated from the sodium carbonate solution. Sodium carbonate monohydrate crystals are then formed from the sodium carbonate solution. This process is generally discussed in U.S. Pat. No. 3,644,331 to Seglin et al., which is incorporated herein by reference. The sodium carbonate monohydrate crystals which are produced can be dewatered, and eventually converted to anhydrous sodium carbonate by drying or calcining.

Embodiments of the present invention can be conducted in combination with other processes known for treating saline minerals and in particular, trona ore. For example, such other processes are generally described in the published Patent Cooperation Treaty applications PCT/US96/00700 for METHOD FOR PURIFICATION OF SALINE MINERALS and in PCT/US94/05918 for BENEFICIATION OF SALINE MINERALS, the disclosures of which are incorporated herein by reference in their entirety. More particularly, separation steps, such as magnetic separation, electrostatic separation, and density separation, can be conducted in conjunction with processes as described herein in detail. Similarly, separation steps based on other properties can be used as well. For example, for ores or treated ores in which fractions having different colors or sizes corresponding to differences in purity, separations can be made on the basis of such properties, as well.

The following experimental results are provided for purposes of illustration and are not intended to limit the scope of the invention.

EXAMPLE

The following example illustrates the effect of calcining temperature and atmosphere on the settling of insoluble impurities in trona ore.

Figure 1:
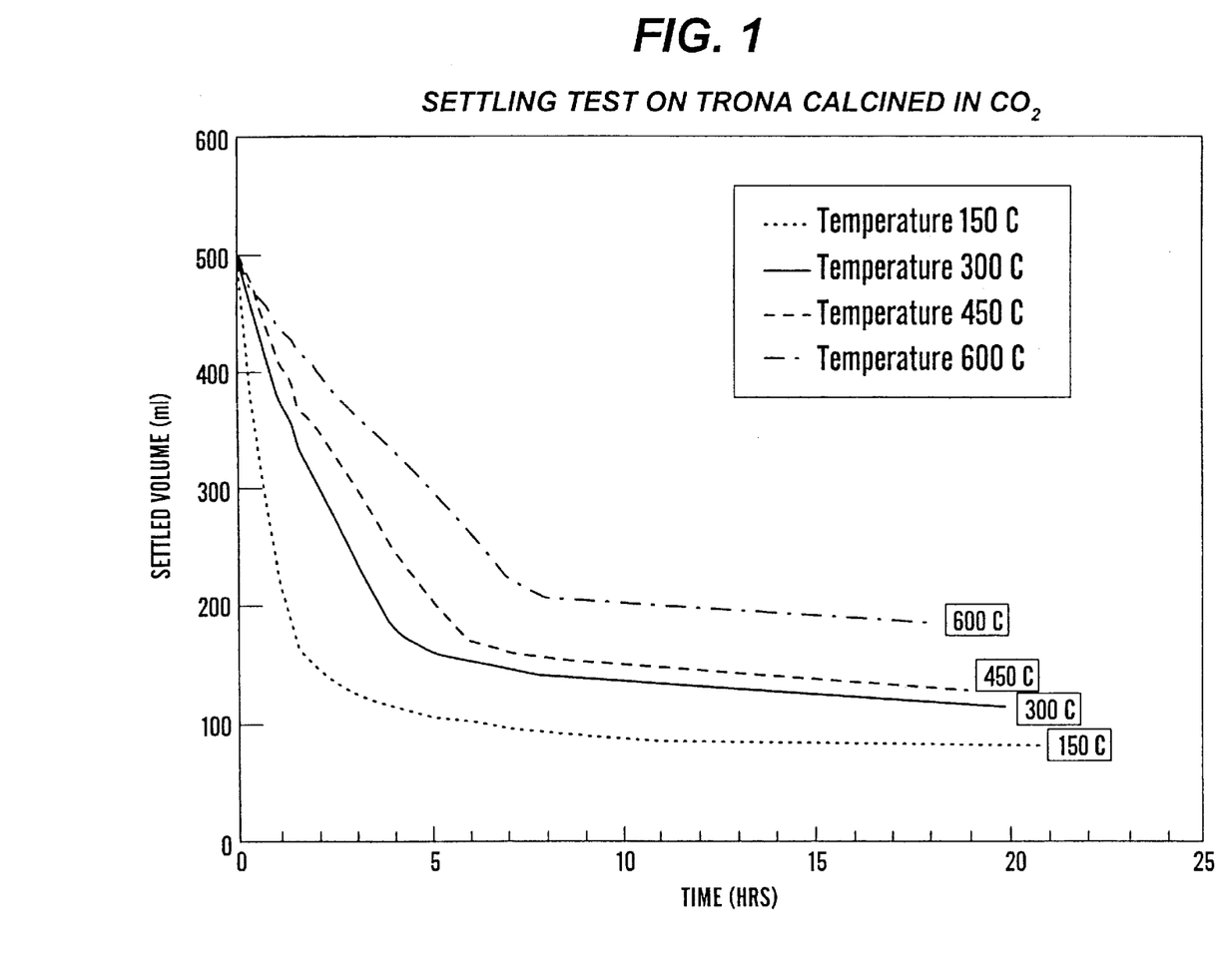
FIG. 1 is a graph illustrating the settling characteristics of trona calcined in a $CO_2$ atmosphere at various temperatures.
Figure 2:
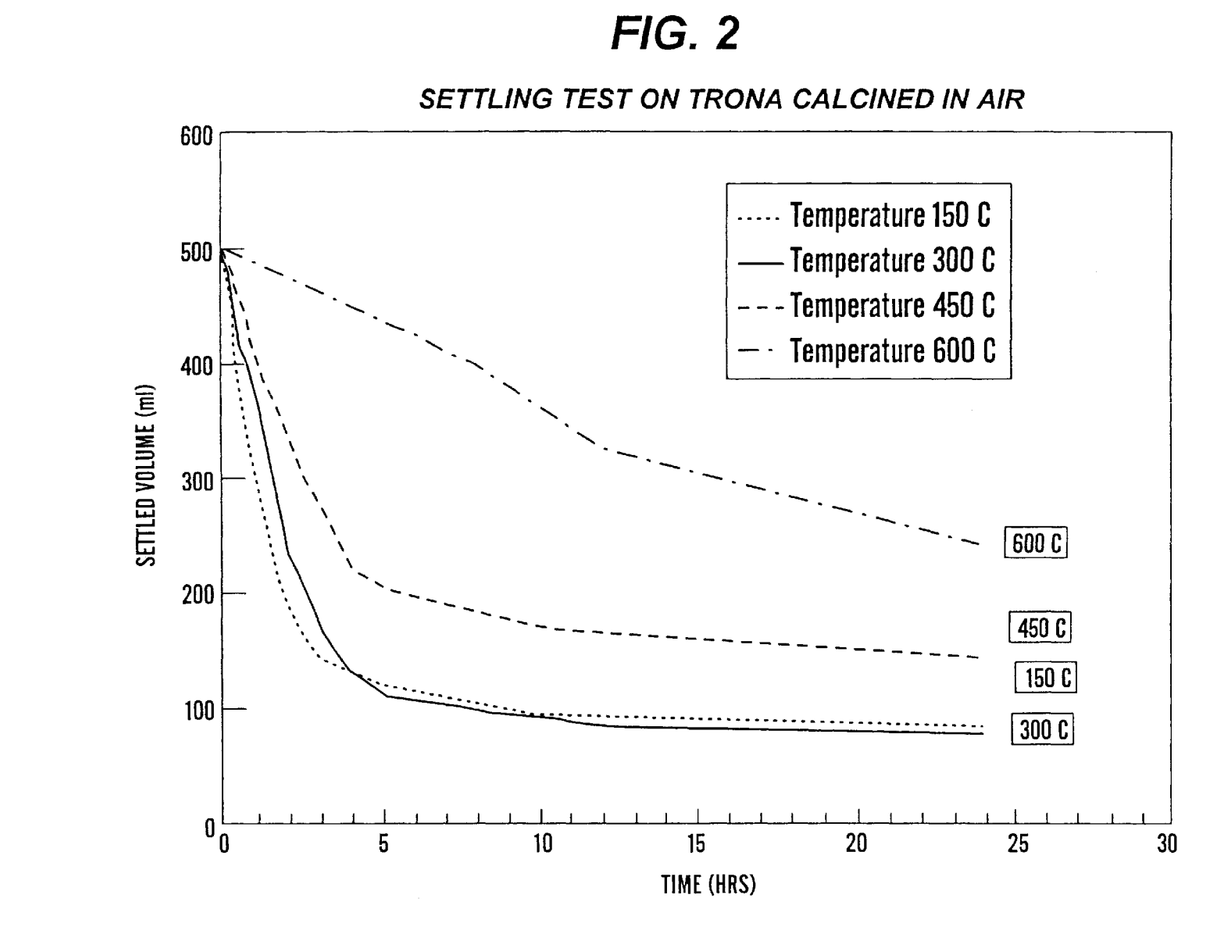
FIG. 2 is a graph illustrating the settling characteristics of trona calcined in an air atmosphere at various temperatures.
Figure 3:
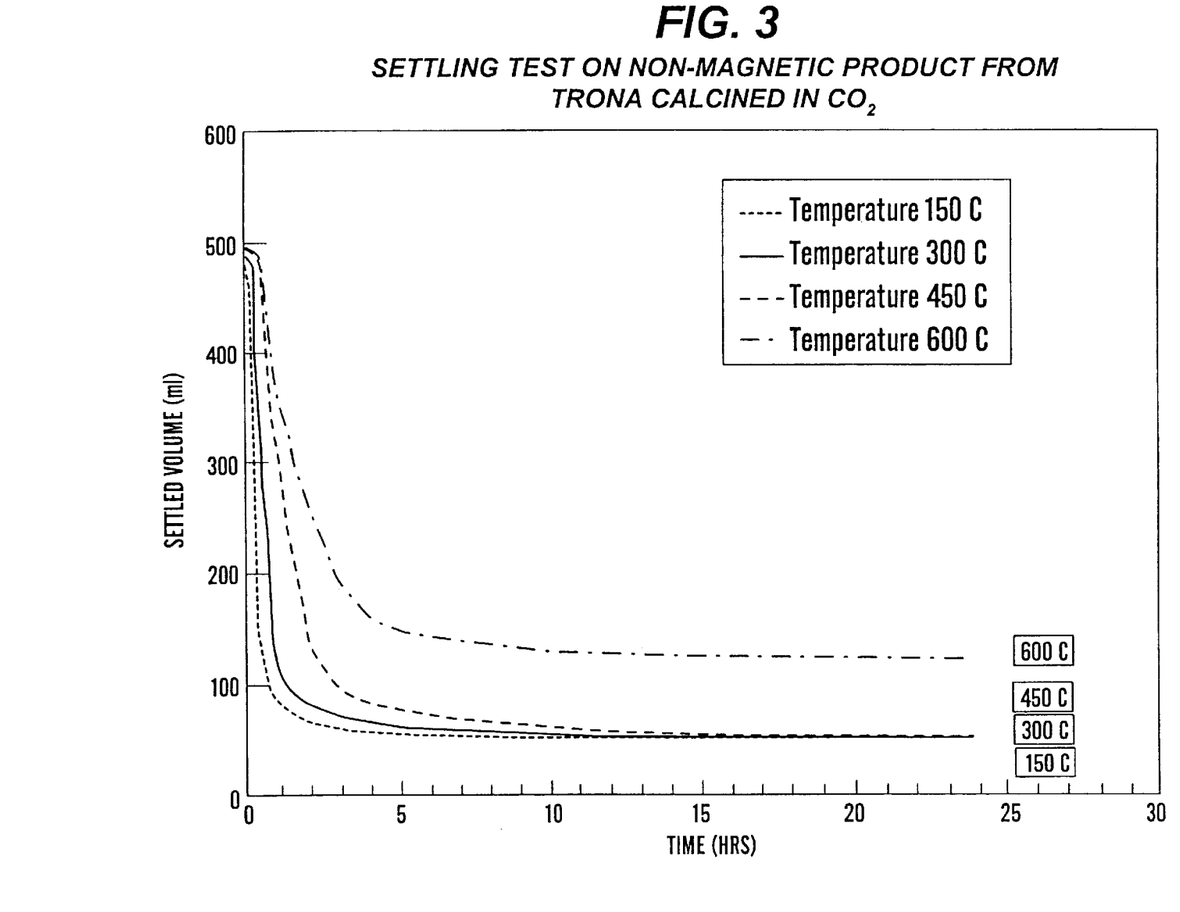
FIG. 3 a graph illustrating the settling characteristics of trona calcined in a $CO_2$ atmosphere at various temperatures and treated to remove magnetic impurities.
Figure 4:
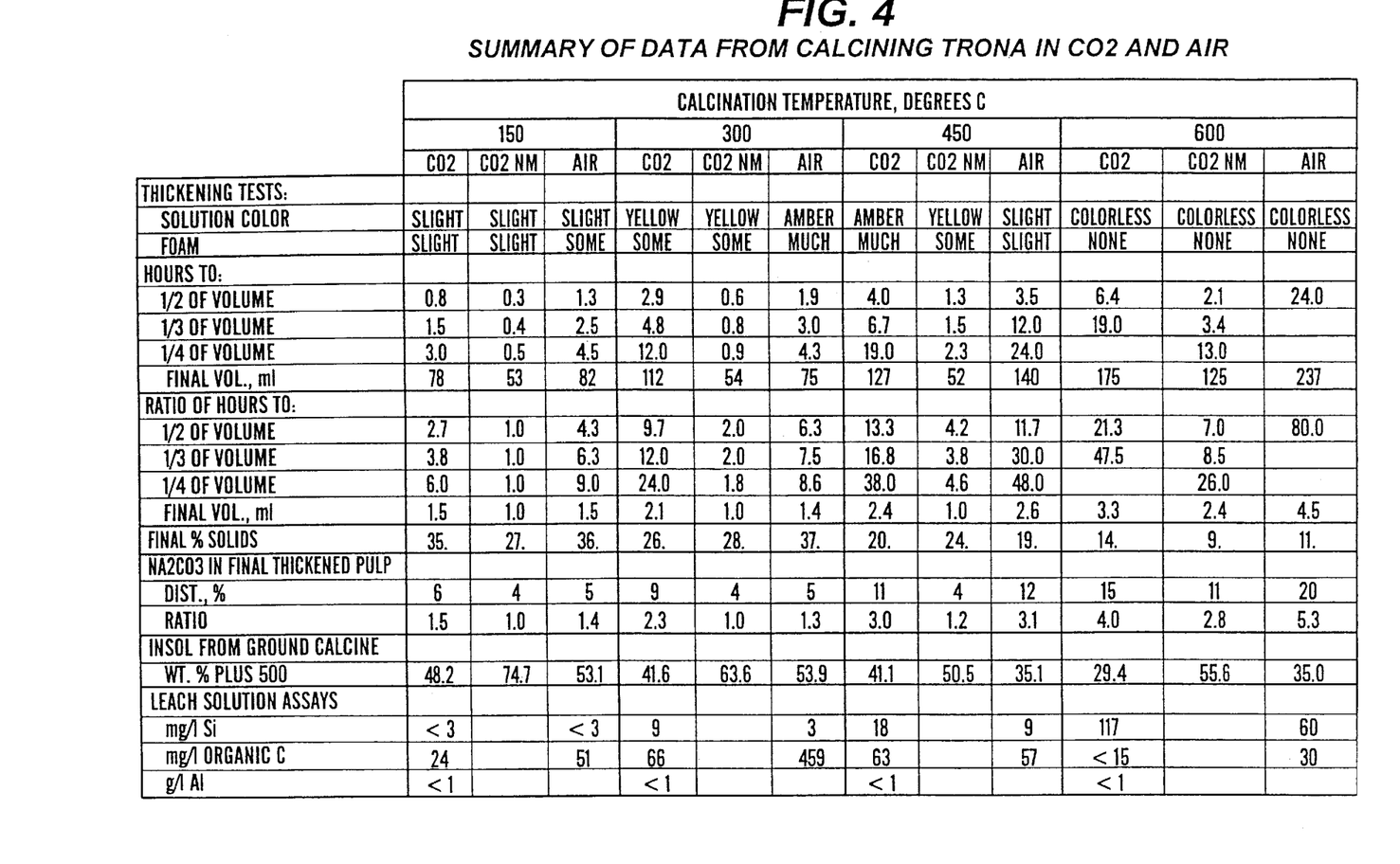
FIG. 4 is a table providing data for various settling and compositional characteristics of trona calcined in a variety of temperatures and atmospheres.

Trona ore having a particle size of less than 20 mesh was calcined at 150° C., 300° C., 450° C., or 600° C. in an atmosphere of either $CO_2$ or air. The ore was then ground to minus 100 mesh, and water was added to completely dissolve all soluble components (i.e., sodium carbonate) of the material. Some of the samples were first treated by magnetic separation before the settling test. The samples were then allowed to settle in graduated cylinders. The volume of settled solid materials was recorded over time to evaluate settling characteristics of the samples. Observations were made regarding the color of the liquid. The final solids content of the various samples, and the sodium carbonate content of the thickened pulp were determined. The results of the various settling tests are illustrated in the graphs in FIGS. 1–3 and the chart in FIG. 4.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for producing sodium carbonate from a feedstream containing trona and insoluble impurities, comprising the steps of:
   (a) heating said feedstream in a calcining apparatus to a temperature of less than about 350° C. to form anhydrous sodium carbonate, wherein a heat source in said calcining apparatus is not in direct fluid communication with said feedstream;
   (b) contacting said anhydrous sodium carbonate with a saturated sodium carbonate brine solution for a residence time to form sodium carbonate monohydrate crystals;
   (c) separating at least a portion of said sodium carbonate monohydrate crystals from at least a portion of said insoluble impurities to form an impurity stream; and
   (d) allowing insoluble impurities to settle from said impurity stream to form a recycle stream.

2. The process of claim 1, wherein said temperature of heating is from about 120° C. to about 250° C.

3. The process of claim 1, wherein said calcining apparatus is a fluidized bed reactor.

4. The process of claim 1, further comprising the step of comminuting said feedstream to provide a comminuted feedstream before step (a).

5. The process of claim 4, wherein particles in said comminuted feedstream have a particle size of less than about ¼ inch.

6. The process of claim 4, wherein said feedstream is sized into 3 or more size fractions.

7. The process of claim 1, wherein said heating step comprises the steps of:
   heating a fluid; and
   bringing the heated fluid into thermal communication with said feedstream.

8. The process of claim 7, wherein said step of heating said fluid comprises the steps of:
   (i) combusting an energy source to produce heat and combustion gas;
   (ii) transferring at least a portion of the heat to the fluid; and
   (iii) directing at least a portion of the combustion gas through a combustion gas outlet
   which is not in direct fluid communication with said calcining vessel.

9. The process of claim 8, wherein said step of heating said feedstream further comprises the steps of:
   removing calcining gas from said heating step through a calcining gas outlet; and
   combining at least a portion of said calcining gas with at least a portion of said combustion gas.

10. The process of claim 9, further comprising the steps of removing said calcining gas from said heating step and condensing at least a portion of water vapor from said calcining gas.

11. The process of claim 10, wherein particulates are removed from said calcining gas during said condensing step.

12. The process of claim 10, wherein said step of condensing at least a portion of said water vapor comprises the step of condensing said portion of water vapor by cooling said calcining gas.

13. The process of claim 1, further comprising the step of separating a portion of said impurities from said trona before step (a) by a process selected from the group consisting of magnetic separation, electrostatic separation, density separation, colorimetric separation and size purification.

14. The process of claim 1, wherein the temperature of said saturated sodium carbonate brine solution is from about 35° C. to about 112° C.

15. The process of claim 1, wherein the temperature of said saturated sodium carbonate brine solution is at least about 95° C.

16. The process of claim 1, wherein said separation of said sodium carbonate monohydrate crystals from said saturated sodium carbonate brine solution is by size separation.

17. The process of claim 16, wherein said sodium carbonate monohydrate crystals separated from said saturated sodium carbonate brine solution have a particle size of at least about 100 mesh.

18. The process of claim 16, wherein a non-recovered portion from said size separation step comprises insoluble impurities and said sodium carbonate monohydrate crystals having a particle size of less than about 100 mesh.

19. The process of claim 18, further comprising the step of dissolving said sodium carbonate monohydrate crystals from said non-recovered portion and separating said insoluble impurities from said dissolved crystals.

20. The process of claim 19, further comprising the step of recycling said dissolved sodium carbonate monohydrate crystals from said non-recovered portion by introducing a stream containing said dissolved sodium carbonate monohydrate crystals from said non-recovered portion into said saturated sodium carbonate brine solution.

21. The process of claim 16, further comprising the step of drying or calcining said separated sodium carbonate monohydrate crystals and converting said separated sodium carbonate monohydrate crystals to anhydrous sodium carbonate crystals.

22. The process of claim 1, further comprising the step of gravity purification of said impurity stream.

23. The process of claim 22, wherein said impurity stream has a final density of at least about 20% solids.

* * * * *